United States Patent

[11] 3,576,170

| [72] | Inventor | Robert M. Bush |
| | | Santa Barbara, Calif. |
| [21] | Appl. No. | 790,573 |
| [22] | Filed | Jan. 13, 1969 |
| [45] | Patented | Apr. 27, 1971 |
| [73] | Assignee | Hydranautics |
| | | Santa Barbara, Calif. |

[54] SURGE-DAMPENING SYSTEM
4 Claims, 8 Drawing Figs.

[52] U.S. Cl. .................................................. 114/235
[51] Int. Cl. .......................................... B63b 21/00
[50] Field of Search ................................. 114/235, 230, 235.1, 235.2, 235.3

[56] References Cited
UNITED STATES PATENTS
3,398,715  8/1968  Burg .............................. 114/235(.2)
2,331,567  10/1943  Pettigrav-Smith .............. 114/235.1
2,378,417  6/1945  Linsley ......................... 280/486

FOREIGN PATENTS
1,174,901  11/1958  France ........................ 114/230
1,266,466  6/1961  France ........................ 114/235(.2)

Primary Examiner—Trygve M. Blix
Attorney—Spensley, Horn & Lubitz

ABSTRACT: A system is disclosed for providing surge dampening particularly adaptable for mooring and towing vessels. The surge dampener is coupled in the line or gear utilized to moor or tow a vessel. The forces created in the line by the action of the wave motion on the vessels are greatly dampened, reducing the force applied to the line and to the points to which they are secured. The system utilizes a hydraulic-gas dampener.

PATENTED APR 27 1971
3,576,170
SHEET 1 OF 3
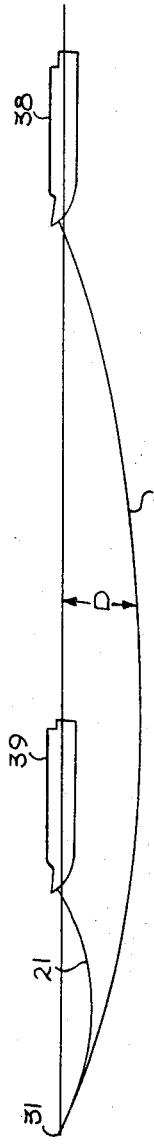
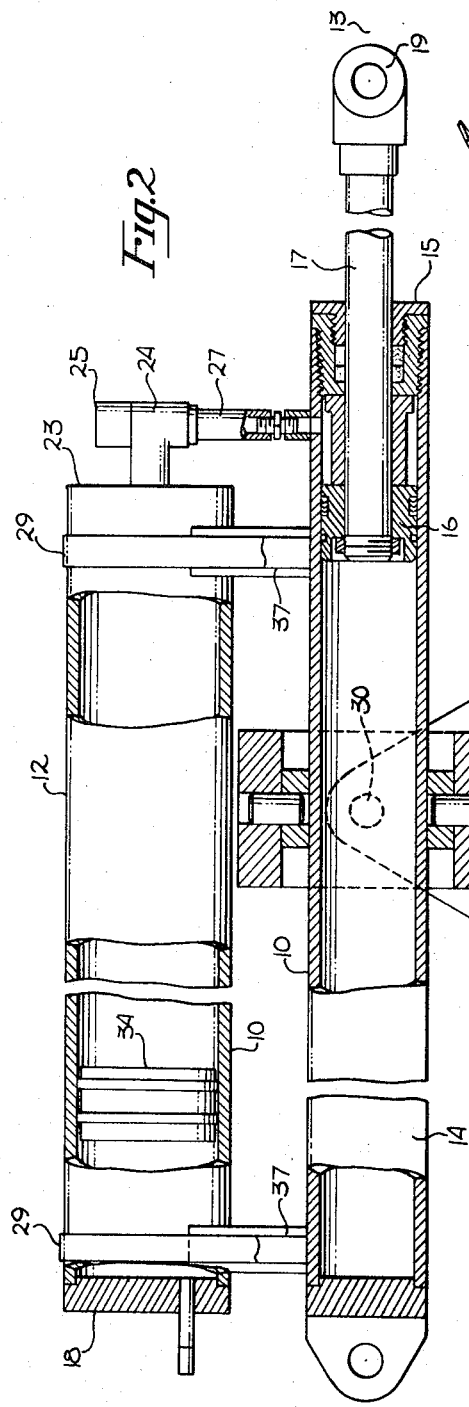
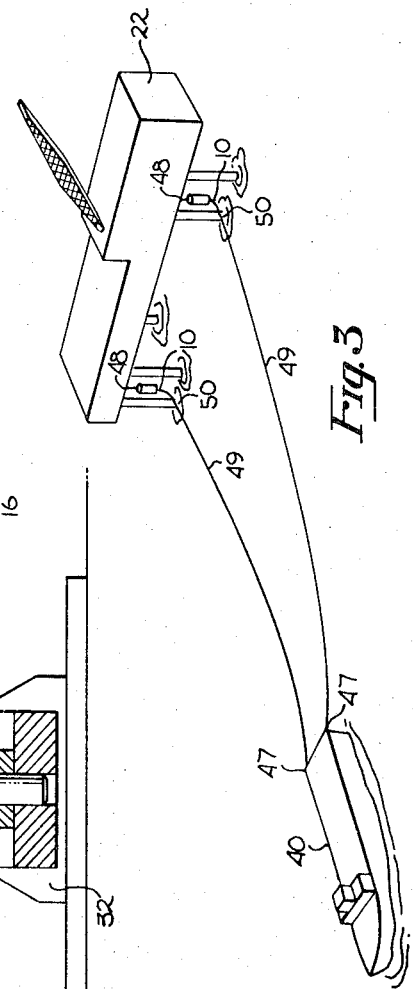
ROBERT M. BUSH
INVENTOR.
BY Spensley & Horn
ATTORNEYS

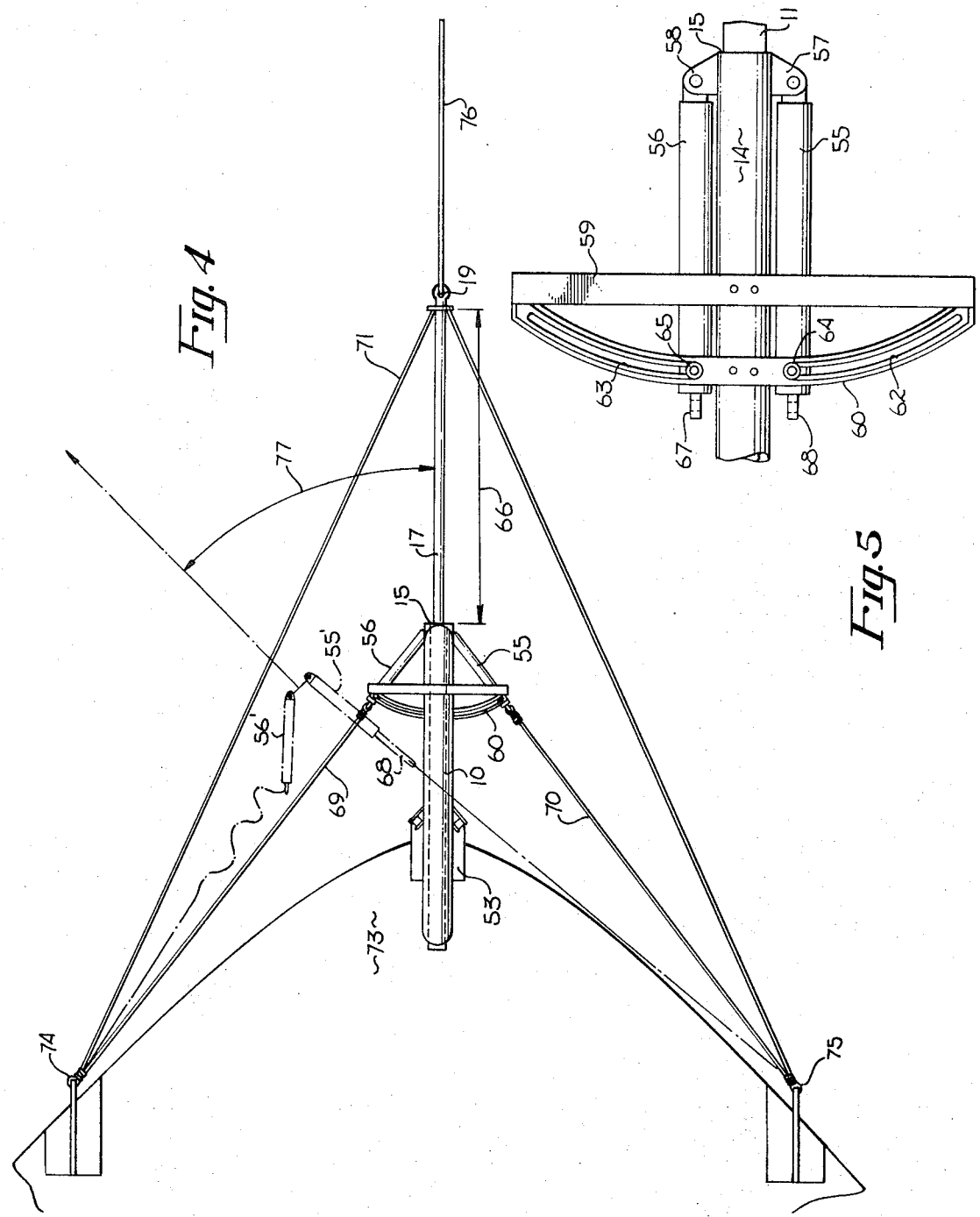

ROBERT M. BUSH
INVENTOR.

BY Spensley & Horn

ATTORNEYS

3,576,170

SURGE-DAMPENING SYSTEM

BACKGROUND OF THE INVENTION

1. Field of the Invention

The invention relates to the field of dampening systems suitable for use in towing and mooring vessels.

2. Description of the Prior Art

In towing a vessel, particularly in ocean waters, extremely high tensions are generated in the towing gear or line. These tensions are caused by the wave action on the towed and towing vessels, and the resulting relative movement of the vessels. The magnitude of this tension often greatly exceeds the strength of the points on the vessels to which the line is attached. Long lines are generally used to permit the relative movement and attenuate the tension created by the wave motion. The stretching and movement of the line absorbs energy, thereby attenuating the forces that would otherwise be exerted on the vessels.

It is common to utilize very long sagging tow lines in order to absorb and dissipate sufficient energy to attenuate the forces caused by wave action to a tolerable level. Typically, lines of 2,500 to 5,000 feet are utilized. These lines, while supplying the required attenuation, have the disadvantage of having considerable drag since they must be towed through the water by the towing vessel. Often, as much as 35 percent of the towing vessel's power is utilized to tow the line connecting the two vessels.

A similar problem exists with mooring a vessel. Wave action on the moored vessel, particularly when the vessel is moored in rough waters, creates high tensions in the mooring cables. It is a common practice to utilize long mooring lines in order to attenuate these forces.

One prior art attempt to solve part of the problem is to employ springs interposed in the tow line. Such a solution has in general, been impractical and unacceptable. The springs employed are large and heavy. For example, to obtain the desired compensation, a spring of 40 feet in length may be required. In addition, it may create a snapback situation which could result in even greater forces. Finally, the desired spring rate and load buildup is extremely difficult to achieve with a practical and economical spring.

SUMMARY OF THE INVENTION

A surge dampener is utilized in the line or gear which is utilized to tow or moor a ship. The dampener is pivotally coupled to a secure point on a vessel when used as part of a towing system. The dampener comprises a hydraulic cylinder having a piston and a piston rod. The piston rod is coupled to the line which is used to moor or tow a vessel. An accumulator cylinder, which is coupled to the hydraulic cylinder, contains a free piston which separates hydraulic fluid from a gas or pneumatic section of the cylinder. The accumulator is adapted to receive hydraulic fluid from the hydraulic cylinder when the piston rod moves. As fluid is forced into the accumulator, the gas in the pneumatic section of the accumulator cylinder is compressed. Work is performed on both the hydraulic cylinder and gas, which absorbs energy from the movement of the piston rod. This energy absorption and loss attenuates the forces applied to the line or gear, particularly those generated by wave action.

It is an object of this invention to provide a surge-dampening system suitable for use in towing or mooring a vessel.

It is still a further object of this invention to provide a surge dampener which attenuates the forces exerted on a towing or mooring, line or gear generated by wave motion.

BRIEF DESCRIPTION OF THE DRAWINGS

FIG. 1 illustrates two vessels being towed, one with a conventional line and the other with a shortened line;

FIG. 2 illustrates a side view of a surge dampener with partial cutaway views of the hydraulic cylinder and accumulator cylinder;

FIG. 3 illustrates a vessel moored to a dock where the mooring lines contain two surge dampeners;

FIG. 4 illustrates a surge dampener secured to a vessel and coupled to a steering bridle and a safety bridle;

FIG. 5 illustrates an expanded view of the end of the hydraulic cylinder nearest the piston rod, containing two shock absorbers;

DETAILED DESCRIPTION OF THE INVENTION

Figure 6:
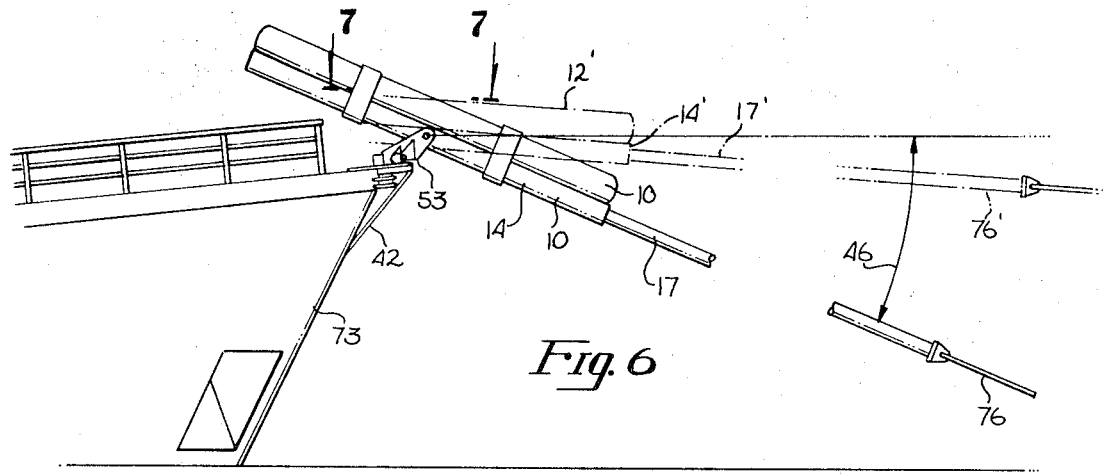
FIG. 6 is a side view of a surge dampener pivotally mounted to a secured point on a vessel.

Referring to FIG. 2, a surge dampener 10 is illustrated. Dampener 10 is comprised of hydraulic cylinder 14, accumulator cylinder 12, coupling means between the accumulator and the hydraulic cylinders, pistons 16 and 34 and a piston rod 17. The dampener 10 is illustrated in FIG. 1 pivotally coupled to a mount 32.

Hydraulic cylinder 14 is an elongated cylinder suitable for containing a hydraulic fluid. Piston 16 is disposed within cylinder 14 and sealingly engages the inner surface of cylinder 14. Piston rod 17, coupled to piston 16 by screw thread means, is disposed through end 15 of hydraulic cylinder 14. End 15, which sealingly engages rod 17, is coupled to cylinder 14 by threaded means. Hydraulic cylinder 14 must be adaptable to sealingly contain a fluid between piston 16 and end 15. An eye bolt 19 is coupled to piston rod 17 at the end of the rod opposite piston 16. Hydraulic cylinder 14 along with its piston 16 and piston rod 17 may be constructed in accordance with commonly known methods and techniques.

Accumulator cylinder 12 is coupled in juxtaposition to hydraulic cylinder 14. Space blocks 37 are used to support accumulator 12 on cylinder 14. Straps 29 are disposed about the periphery of accumulator 12 and cylinder 14 and are used to fasten accumulator 12 to cylinder 14. Accumulator cylinder 12 has a cylindrical shape and is adaptable for containing a liquid and a gas. Free piston 34, which is freely movable within the cylinder, slidingly engages the inner surface of accumulator cylinder 12. Filler port 36 is coupled to one end of the accumulator 12. The filler port is any port suitable for allowing a gas to flow into the accumulator. The accumulator cylinder 12 must be suitable for containing a fluid between free piston 34 and end 23, and suitable for containing a compressed gas between free piston 34 and end 18. Accumulator 12 may be constructed in accordance with the same technique and methods required to construct hydraulic cylinder 14.

Hydraulic cylinder 14 is coupled to accumulator 12 by means of flow regulator 27 and T-connector 24. One end of flow regulator 27 is coupled to hydraulic cylinder 14 at or near the end of the hydraulic cylinder closest to end 15. The other end of flow regulator 27 is coupled to T-connector 24. T-connector 24 is in turn coupled to accumulator 12 at end 23 and filler port 25. Hydraulic filler port 25 may be a commonly utilized filler port for inserting hydraulic fluid into the accumulator 12 and hydraulic cylinder 14. The T-connector 24, filler port 25 and flow regulator 27 may be commonly utilized hydraulic components made to engage one another, accumulator 12, and hydraulic cylinder 14 by threaded means. Flow regulator 27 may be a commonly utilized flow regulation device for permitting fluid to freely flow into cylinder 12 by movement of piston 16 from left to right in FIG. 1 and for restricting the flow of fluid from cylinder 12 back to cylinder 14 when piston 16 moves in the opposite direction. This enables piston rod 17 to move from right to left in FIG. 2 in a controlled manner.

The operation of the surge dampener 10 may be readily understood from FIG. 2. Hydraulic fluid fills the volume in the dampener 10 between free piston 34 and piston 16. This entire volume contains the hydraulic fluid used in the dampener. Compressed gas is utilized in the accumulator 12 between free piston 34 and end 18. As a force is applied to piston rod 17 in the direction of arrow 13, piston 16 is caused to move in the direction of arrow 13. As this movement occurs, hydraulic fluid is forced from hydraulic cylinder 14 through flow regulator 27 and T-connector 24 into accumulator 12. This hydraulic fluid forces free piston 34 toward end 18 of accumulator 12. As free piston 34 moves toward end 18, the gas contained between the piston and the end is compressed. After the force applied to piston rod 17 is removed, the compressed gas in accumulator 34 forces the hydraulic fluid from accumulator 12 back into hydraulic cylinder 14 thereby moving piston 16 away from end 15 of cylinder 14. Flow regulator 27 prevents snapback in the return.

Work is performed on the gas in accumulator 12 and on the hydraulic fluid when the pistons in the cylinders are moved. Typically, the gas and the fluid experience a rise in temperature and as a result heat is dissipated from the dampener 10. This dissipation of heat or energy dampens the forces applied to piston rod 17, and thus, the forces transmitted to mount 32 are less severe than those applied to the piston rod 17. The amount of dampening provided by dampener 10 may be varied by changing the flow regulator 27 and by changing the amount of gas contained in accumulator 12. Any one of numerous commonly utilized hydraulic fluids may be used in dampener 10. An inert gas such as nitrogen may be used in accumulator 12. Thus, when forces or tension are applied to eyebolt 19 in the direction of arrow 13, they are attenuated before they are transmitted to mount 32. Typically, the tension in the lines used for mooring or towing, caused by wave action on the vessels, is transmitted to eyebolt 19 since the lines are coupled to the eyebolt.

Referring to FIG. 3, the use of a pair of surge dampeners 10 for mooring a ship 40 to a dock 22 is illustrated. Surge dampeners 10 are coupled to secured points 48 on dock 22. Lines 49 are coupled between the piston rod of the surge dampeners and the secured points 47 on ship 40. Lines 49 pass through eyebolts 50 so that lines 49 apply forces on the piston rods of the dampeners in lines with the hydraulic cylinders of the dampeners.

Wave action on ship 40 causes tension in lines 49. These tensions are dampened as a result of the energy dissipated from the dampeners 10. The forces applied by lines 49 to secured points 47 and 48 are reduced due to the energy removed at the dampeners 10. In prior art systems, this energy was removed by utilizing long mooring lines which would, due to stretching and sagging, absorb energy. Thus, by utilizing the surge dampeners 10 to moor ship 40, the length of the mooring lines may be reduced since the forces normally attenuated by the long lines are now attenuated by surge dampeners 10. It is obvious that the same results could have been obtained with the surge dampeners 10 secured to points 47 on ship 40 and with lines 49 coupled between the piston rods of the dampeners and secured points 48 on dock 22.

Referring to FIG. 4, the use of a surge dampener system for towing a vessel is illustrated. Surge dampener 10 is pivotally coupled to vessel 73 by means of trunnion 53. Vessel 73 may be the towing vessel or the towed vessel. As will be readily apparent from the description to follow, the surge dampener with the illustrated bridles may be utilized on either or both the towed or towing vessel. Since the cylinder is likely to have a length of in excess of 6 feet, it would be quite cumbersome and difficult to mount it along the length of the tow line. In addition, such mounting would not facilitate handling, maintenance, or durability.

Referring to FIGS. 4 and 5, a steering bridle is coupled to the end 15 of hydraulic cylinder 14. This bridle comprises shock absorbers 55 and 56, hingingly coupled to hinges 57 and 58, respectively (FIG. 5). The hinges are fastened to hydraulic cylinder 14 or may be an integral part of end 15 (FIG. 2). Shock absorbers 55 and 56 are elongated members suitable for absorbing shock or force applied between the absorber body and plungers 67 and 68. Plungers 67 and 68 move relative to the body of the shock absorber when cylinder 14 pivots in the horizontal plane about the trunnion 53. Commonly known pneumatic and/or spring shock absorber means may be utilized or a surge dampener similar to surge dampener 10 may be used in this application.

Horizontal guide bar 60, a curved metal member, is rigidly affixed to cylinder 14 (FIG. 5). Crossbar 59, also rigidly affixed to cylinder 14, is coupled to the ends of bar 60 to provide support to the horizontal guide bar 60. Guide slots 62 and 63 are provided in the bar 60. Slot 63 is radiused about hinge 58 while guide slot 62 is radiused about hinge 57. Guide pins 64 and 65 are disposed through slots 62 and 63, respectively, and are rigidly affixed to shock absorbers 55 and 56, respectively. Thus, shock absorbers 55 and 56 are able to move about hinges 57 and 58 within guide slots 62 and 63.

Steering bridle cable 69 is coupled between plunger 67 of shock absorber 56 and secure point 74 on vessel 73. Secure point 74 is a point on vessel 73 to one side of dampener 10. Steering bridle cable 70 is coupled between plunger 68 of shock absorber 55 and secure point 75 on vessel 73. Secure point 75 is the point on vessel 73 to the other side of dampener 10 and opposite secure point 74. The length of steering bridle cables 69 and 70 is such that when the longitudinal axis of surge dampener 10 is aligned with the longitudinal centerline of vessel 73, the plungers of the shock absorbers not extended and the bridle cables 69 and 70 are taut. Bridles 69 and 70 may be ordinary lines or cables commonly utilized in the marine industry.

Safety bridles 71 and 72 are coupled between eyebolt 19 at one end of piston rod 17 and secure points 74 and 75, respectively. Bridles 71 and 72 may be ordinary lines or cables commonly utilized in the marine industry. The length of lines 71 and 72 are such that when piston rod 17 is approximately fully extended from cylinder 14 and when cylinder 14 is aligned with the centerline of vessel 73, both bridles 71 and 72 will be taut. Safety bridles 71 and 72 prevent piston rod 17 from being pulled from cylinder 14, thus, before piston 16 reaches end 15 (FIG. 2), bridles 71 and 72 will become taut and prevent the piston from striking the end of the cylinder. In addition, the bridle serves the purpose of limiting the extension of piston rod 17 when dampener 10 is at a swivel angle with respect to the centerline of vessel 73, as indicated by angle 77. In the event that dampener 10 or trunnion 53 should fail, the safety bridle prevents the loss of line 76 since these bridles are coupled to line 76 through eyebolt 19.

Figure 7:
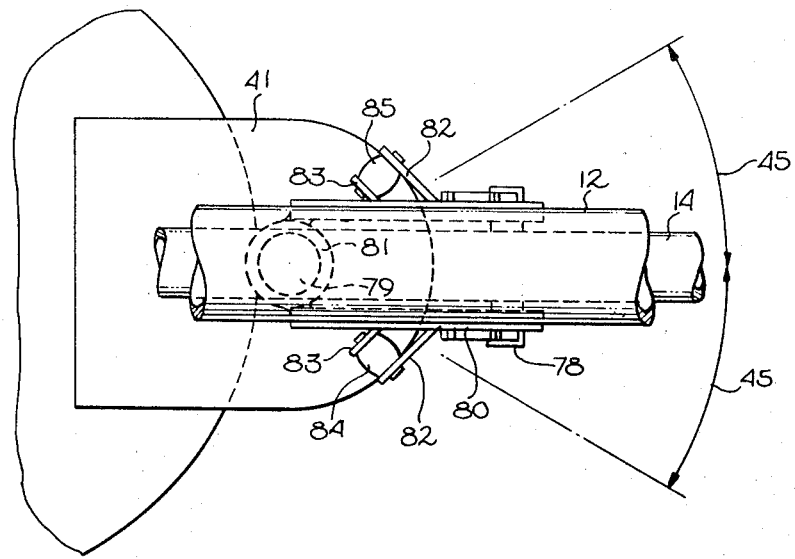
FIG. 7 is a top view of the trunnion to which the surge dampener of FIG. 6 is mounted.
Figure 8:
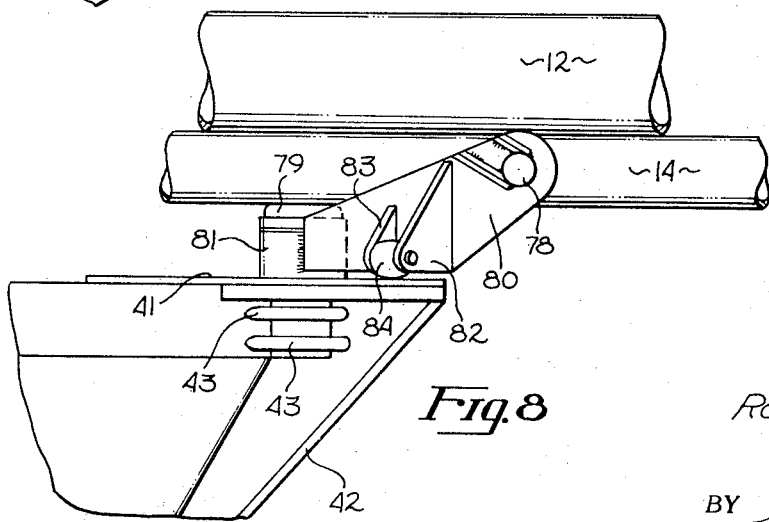
FIG. 8 is an expanded side view of the trunnion to which the surge dampener of FIGS. 6 and 7 is mounted.

Referring to FIGS. 6, 7 and 8, the pivotal mounting between surge dampener 10 and vessel 73 is illustrated. This pivotal mounting allows dampener 10 to move to a nod angle indicated by angle 46 (FIG. 6) and through a swivel angle indicated by angles 45 (FIG. 7).

Cylinder 14 of dampener 10 is coupled to trunnion 53 by means of axles 78 (FIG. 8). Axles 78 are rotatably disposed through sideplates 80 of trunnion 53 and fixedly coupled to cylinder 14. Thus, movement through a nod angle is possible about axle 78. The extent of the nod angle movement may be limited by appropriate stops on sideplate 80 and by swivel pin 79.

Trunnion 53 is comprised of vertical sideplates 80, truck supports 82 and 83, trucks 84 and bearing 81. Sideplates 80 are triangularly shaped plates extending vertically from bearing 81. Truck supports 82 and 83 are triangularly shaped plates coupled to sideplates 80. Trucks 84 are rotatably disposed between sideplates 82 and 83. Bearing 81 is a cylindrical sleeve-type bearing coupled to sideplates 80 and rotatably mounted on swivel pin 79. The various parts of trunnion 53 may be made from metal such as steel and assembled using commonly known metal-working techniques.

Trunnion 53 swivels about swivel pin 79 on pulpit 41. Swivel pin 79 rotatably engages bearing 81 and is rigidly coupled to vessel 73 by means of U-bars 43. Pulpit 41, a flat platform, is rigidly coupled to vessel 73 and is supported by flanged knee 42. Other means commonly known and utilized for permitting a nod and swivel movement may be utilized in place of the above-described trunnion 53.

The use of surge dampener 10 in a towing system may be readily understood from FIGS. 1, 4 and 6. In FIG. 1, the prior art method of towing a vessel 38 is shown using tow line 20. Typically, tow line 20 would be 2,500 to 5,000 feet in length and coupled to a towing vessel 31. With use of the present surge dampener, the tow line may be reduced as illustrated by line 21 to a length of approximately 800 feet. In using the surge dampener system for towing, the dampener is pivotally coupled to a secure point on either the towing vessel or the towed vessel. It is apparent to one skilled in the art that the dampening system herein described will work equally well with the surge dampener placed on either the towed vessel or the towing vessel.

In order to utilize the herein described dampener for towing, a line 76 as illustrated in FIG. 4, is connected from the piston rod 17 of the dampener to a secured point on the vessel not containing the dampener. The length of line 76 utilized with dampener 10 will depend on the amount of energy that the dampener is able to absorb. The dampener 10 may be made to absorb more energy by increasing the length of piston rod 17 and cylinder 14, by increasing the diameter of the pistons in dampener 10 or by changing other aspects of the disclosed system. Several practical limitations exist in shortening the lines 76 beyond the point where (1) directional control in the swivel angle is difficult, (2) the towed vessel is in the wake of the towing vessel, or (3) the towing vessel would be close enough to be overrun by the towed vessel.

Once the surge dampener has been pivotally secured to a first vessel and the line 76 secured to a second vessel, the towing operation proceeds in the same manner as towing is performed with the longer line.

Steering bridles 69 and 70 may be added to dampener 10 in order to increase the steering capability between the vessels. This steering gear enables controlled swiveling, prevents the dampener 10 from making abrupt swivel angle changes and provides shock absorbing means to dampen movement through a swivel angle. Part of the dampener 10 is illustrated in broken line 2 in FIG. 4 after the dampener has swiveled through an angle 77. Shock absorbers 55' and 56' are illustrated with the plunger 68' of shock absorber 55' fully extended. In this position, shock absorber 55 is dampening and controlling the movement of line 70 and dampener 10. As previously explained, the safety bridles 71 and 72 may be added to dampener 10 in order to provide a safety feature to the towing system. As piston rod 17 becomes extended, the safety bridle also limits the movement of dampener 10 in the swivel angle; the greater the extension of piston rod 17, the greater this limitation becomes. When the piston rod 17 is fully extended, the safety bridle limits all movement in the swivel angle.

With reference to FIGS. 6 and 7, it can be readily seen that with dampener 10 mounted on trunnion 53, the dampener is able to rotate freely through a nod angle indicated by angle 46 and swivel freely through an angle indicated by angles 45. Thus, the dampener 10 is able to stay in line with the towing line 76 as that line changes direction due to the movement of the vessels. For example, with low tension in line 76, dampener 10 will assume a position similar to the position shown in FIG. 6. As the tension in line 76 increases, the line will assume a position similar to that shown by line 76'. In this position, piston rod 17' is illustrated coupled to line 76' with dampener 10 having moved through the angle 46.

The savings and/or improved performance which may be realized by utilizing the invented towing system can be illustrated by means of the following example. Referring to FIG. 1, assume that vessel 38 is a barge having a length of 350 feet and a displacement of approximately 10,000 tons. Typically, line 38 in prior art towing systems would be approximately 2,500 feet long and would extend beneath the surface of the ocean for a distance D which is typically 200 feet. At a towing speed of 8.7 knots, the total resistance of barge 38 is approximately 43,195 pounds and the resistance of line 20 is approximately 23,775 pounds. Thus, approximately 35.5 percent of towing vessel 31's horsepower is consumed in towing line 20. By utilizing the presently disclosed dampening system the tow line may be reduced to approximately 800 feet as illustrated by line 21. Line 21 will typically dip approximately 20 feet below the surface of the water as compared with 200 feet for line 20. By reducing the length of line 20, the power requirement for towing line 21 is reduced by greater than 50 percent. Assuming that vessel 39 has the same length and displacement as vessel 38 and that vessel 31 was producing approximately 3,500 horsepower to tow vessel 39 at 8.7 knots, approximately 570 horsepower would be saved by utilizing the shorter line 21. Typical cost figures for power in the marine industry indicate that 50 cents is required per horsepower per day. Thus, by utilizing the shortened line 21 for a period of a year, approximately $90,000 in savings is realized.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A marine towing system for towing an object behind a vessel comprising:
   a fluid surge dampener for dampening applied forces, pivotally coupled to said vessel;
   a tow line coupled between said surge dampener and said object; and,
   a steering bridle comprising a first and a second shock absorbing means, for absorbing shock, each movably coupled to one end of said surge dampener and each coupled to at least one line, said one line coupled between said shock absorber and a point on said vessel to the side of said surge dampener;
   whereby the end of said surge dampener is steered by said bridle when the tow line coupled to said surge dampener moves through a swivel angle.

2. The system defined in claim 1 wherein said surge dampener comprises:
   a hydraulic cylinder having a piston and a piston rod coupled to said piston, said piston and piston rod disposed within said cylinder, said cylinder coupled to said vessel and said piston rod coupled to said line; and
   an accumulator for accumulating hydraulic fluid from said hydraulic cylinder, coupled to said hydraulic cylinder;
   whereby when said line moves in one direction said piston moves in said cylinder and fluid is forced from said cylinder into said accumulator.

3. The system defined in claim 2 containing a safety bridle comprising:
   a first safety line, coupled to said piston rod in the proximity of said tow line and coupled to a point on one side of said vessel; and
   a second line, coupled to said piston rod in the proximity of said tow line and coupled to a point on a second side of said vessel;
   whereby at least one of said safety lines becomes taut before said piston rod is fully extended.

4. The system defined in claim 3 wherein said surge dampener is pivotally coupled to a trunnion means for movement in a horizontal plane, said trunnion means being swivelly coupled to said vessel, said pivotal coupling and trunnion means enabling said surge dampener to move in a horizontal and vertical plane.